United States Patent
Busch (10) Patent No.: US 9,098,283 B2
(45) Date of Patent: Aug. 4, 2015

(54) SWITCHED-MODE POWER SUPPLY UNIT, METHOD OF OPERATION AND USE OF A SWITCHED-MODE POWER SUPPLY UNIT IN A COMPUTER

(75) Inventor: Peter Busch, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 0 days.

(21) Appl. No.: 14/125,464

(22) PCT Filed: May 29, 2012

(86) PCT No.: PCT/EP2012/060047
§ 371 (c)(1),
(2), (4) Date: Feb. 21, 2014

(87) PCT Pub. No.: WO2012/171788
PCT Pub. Date: Dec. 20, 2012

(65) Prior Publication Data
US 2014/0164801 A1   Jun. 12, 2014

(30) Foreign Application Priority Data
Jun. 16, 2011   (DE) .......................... 10 2011 104 441

(51) Int. Cl.
*G06F 1/32* (2006.01)
*G06F 1/26* (2006.01)
(Continued)

(52) U.S. Cl.
CPC ...... *G06F 1/324* (2013.01); *G06F 1/26* (2013.01); *H02M 1/44* (2013.01); *H02M 7/2176* (2013.01); *H02M 3/33523* (2013.01); *H02M 2001/0054* (2013.01); *Y02B 70/1491* (2013.01)

(58) Field of Classification Search
CPC ............... H02M 1/44; H02M 7/2176; H02M 2001/0009; H02M 2001/0035; H02M 2001/0054
USPC ...................... 363/16, 21.01–21.18
See application file for complete search history.

(56) References Cited

U.S. PATENT DOCUMENTS 3,919,648 A * 11/1975 Uetrecht ........................ 327/555
4,056,996 A * 11/1977 Bunger ........................... 84/673
(Continued)

FOREIGN PATENT DOCUMENTS

DE   10 2005 055 160 A1   5/2007
JP          9-182423         7/1997
(Continued)

OTHER PUBLICATIONS

"MAX5974—Active-Clamped, Spread-Spectrum, Current-Mode PWM Controllers," SemiconductorRelease.com.
(Continued)

*Primary Examiner* — Timothy J Dole
*Assistant Examiner* — Yusef Ahmed
(74) *Attorney, Agent, or Firm* — DLA Piper LLP (US)

(57) ABSTRACT

A switched-mode power supply unit for a computer includes at least one switching element that switches a charging current to charge a storage element, at least one secondary output circuit that provides an output voltage (Vout+), at least one controllable oscillator circuit that provides a switching clock, and at least one control circuit that determines a switch-off time for the at least one switching element, wherein, in operation of the switched-mode power supply unit, a mean oscillator clock of the oscillator circuit is controlled in dependence on a controlled variable (Vcontrol) specifying the output voltage or power of the secondary output circuit such that the mean oscillator clock rises monotonously with the output power and a switch-on time for the at least one switching element is determined in dependence on the mean oscillator clock and a random deviation.

16 Claims, 3 Drawing Sheets

(51) Int. Cl.
*H02M 1/44* (2007.01)
*H02M 7/217* (2006.01)
*H02M 3/335* (2006.01)
*H02M 1/00* (2007.01)

(56) References Cited

U.S. PATENT DOCUMENTS

| | | | | |
|---|---|---|---|---|
| 4,352,054 | A * | 9/1982 | Grunsch et al. | 323/224 |
| 4,937,728 | A * | 6/1990 | Leonardi | 363/97 |
| 5,173,847 | A * | 12/1992 | Suzuki | 363/21.14 |
| 5,811,948 | A * | 9/1998 | Sato et al. | 318/434 |
| 7,054,171 | B1 * | 5/2006 | Bailly et al. | 363/21.08 |
| 7,161,815 | B2 * | 1/2007 | Mori | 363/21.12 |
| 8,049,481 | B2 * | 11/2011 | Li et al. | 323/283 |
| 8,194,425 | B2 * | 6/2012 | Park et al. | 363/21.18 |
| 8,201,012 | B2 * | 6/2012 | Ku | 713/501 |
| 8,279,638 | B2 * | 10/2012 | Hsu | 363/21.16 |
| 2001/0036092 | A1 * | 11/2001 | Yasumura | 363/21.04 |
| 2002/0021575 | A1 * | 2/2002 | Yasumura | 363/21.04 |
| 2002/0136034 | A1 * | 9/2002 | Feldtkeller | 363/21.01 |
| 2004/0232978 | A1 | 11/2004 | Easson et al. | |
| 2004/0232979 | A1 | 11/2004 | Edwards et al. | |
| 2004/0265115 | A1 * | 12/2004 | Busch | 415/1 |
| 2007/0058399 | A1 * | 3/2007 | Meitzner et al. | 363/21.01 |
| 2007/0115696 | A1 * | 5/2007 | Berghegger | 363/16 |
| 2007/0121258 | A1 * | 5/2007 | Hachiya | 361/18 |
| 2007/0132438 | A1 * | 6/2007 | Jang et al. | 323/282 |
| 2008/0084723 | A1 * | 4/2008 | Balakrishnan et al. | 363/97 |
| 2008/0259659 | A1 * | 10/2008 | Choi et al. | 363/50 |
| 2008/0284479 | A1 * | 11/2008 | Mlcousek et al. | 327/175 |
| 2009/0086513 | A1 * | 4/2009 | Lombardo et al. | 363/21.12 |
| 2009/0201705 | A1 * | 8/2009 | Murata et al. | 363/53 |
| 2009/0279332 | A1 * | 11/2009 | Grant et al. | 363/84 |
| 2010/0019809 | A1 * | 1/2010 | Hwang et al. | 327/129 |
| 2010/0053999 | A1 * | 3/2010 | Jang et al. | 363/21.01 |
| 2010/0090775 | A1 * | 4/2010 | Huda et al. | 332/117 |
| 2010/0275052 | A1 | 10/2010 | Ku | |
| 2010/0302816 | A1 * | 12/2010 | Hu et al. | 363/21.12 |
| 2010/0315838 | A1 * | 12/2010 | Mao et al. | 363/16 |
| 2011/0085356 | A1 * | 4/2011 | Morota | 363/21.04 |
| 2011/0096574 | A1 * | 4/2011 | Huang | 363/21.18 |
| 2011/0110126 | A1 * | 5/2011 | Morrish | 363/21.18 |
| 2011/0311259 | A1 * | 12/2011 | Hayasaki et al. | 399/88 |
| 2012/0008346 | A1 * | 1/2012 | Kawamura | 363/21.15 |
| 2012/0106208 | A1 * | 5/2012 | Sugawara | 363/21.13 |
| 2014/0063865 | A1 * | 3/2014 | Nate | 363/21.13 |

FOREIGN PATENT DOCUMENTS

| | | |
|---|---|---|
| JP | 2004-304885 | 10/2004 |
| JP | 2007-20320 | 1/2007 |
| JP | 2009-153364 | 7/2009 |
| JP | 2010-81686 | 4/2010 |

OTHER PUBLICATIONS

"PWM Spread Spectrum," (abstract), www.telecom-robitcs.org.
Data Sheet TEA1654, GreenChip™II SMPS control IC Product Specification, May 12, 2003, Philips Semiconductors.
M. Kuisma, "Variable frequency switching in power supply EMI-control: an overview," IEEE Aerospace and Electronic Systems Magazine, vol. 18, No. 12, Dec. 1, 2003, pp. 18-22 (Abstract only).

* cited by examiner

SWITCHED-MODE POWER SUPPLY UNIT, METHOD OF OPERATION AND USE OF A SWITCHED-MODE POWER SUPPLY UNIT IN A COMPUTER

TECHNICAL FIELD

This disclosure relates to a switched-mode power supply unit for a computer or the like, comprising at least one switching element that switches a charging current for charging a storage element. The disclosure also relates to a method of operation for a switched-mode power supply unit and to the use of a switched-mode power supply unit in a computer.

BACKGROUND

Switched-mode power supply units in different models are widely known. Compared with other power supply types such as, especially, conventional transformer power supplies, switched-mode power supplies have a relatively high efficiency. In addition, switched-mode power supply units have a relatively large range of tolerance for input voltages and frequencies, a smaller constructional size and less expensive production costs compared with conventional power supplies.

Theoretically, switched-mode power supply units, due to their switching principle, only transfer the power actually needed on the secondary side. Known switched-mode power supply units therefore have an efficiency of often over 90% within an operating range of about 20 to 100% of their nominal output power. Unfortunately, the efficiency of known switched-mode power supply units drops considerably especially below 20% of the nominal output power. Among other things, this is caused by chopping the input voltage on the primary side, due to the principle, and the associated switching losses.

It is especially in the case of computers and similar devices which, on the one hand, require a relatively large input power in operation, but only consume a greatly reduced input power in a quiescent, energy-saving or standby mode, that this represents a problem with respect to the energy efficiency of the switched-mode power supply units used.

It could therefore be helpful to provide a power supply unit and a method of operation for a power supply unit which provides for high energy efficiency over a wide range of possible output powers. In particular, it could be helpful for the energy efficiency in the lower range of a nominal output power to be improved compared to known switched-mode power supply units.

SUMMARY

I provide a switched-mode power supply unit for a computer including at least one switching element that switches a charging current to charge a storage element; at least one secondary output circuit that provides an output voltage (Vout+); at least one controllable oscillator circuit that provides a switching clock; and at least one control circuit that determines a switch-off time for the at least one switching element; wherein, in operation of the switched-mode power supply unit, a mean oscillator clock of the oscillator circuit is controlled in dependence on a controlled variable (Vcontrol) specifying the output voltage or power of the secondary output circuit such that the mean oscillator clock rises monotonously with the output power and a switch-on time for the at least one switching element is determined in dependence on the mean oscillator clock and a random deviation.

I also provide a switched-mode power supply unit for a computer including at least one switching element that switches a charging current to charge a storage element; at least one secondary output circuit that provides an output voltage (Vout+); at least one controllable oscillator circuit that provides a switching clock; a noise generator that generates at least one random signal (Vn1, Vn2); and at least one control circuit that determines a switch-off time for the at least one switching element; wherein, in operation of the switched-mode power supply unit, a mean oscillator clock of the oscillator circuit is controlled in dependence on a controlled variable (Vcontrol) of the secondary output circuit; a maximum amplitude of the at least one random signal (Vn1, Vn2) of the noise generator is determined in dependence on the controlled variable (Vcontrol); and a switch-on time for the at least one switching element is determined in dependence on the mean oscillator clock and a random deviation determined by the random signal of the noise generator.

I further provide a method of operation for a switched-mode power supply unit including determining at least one controlled variable (Vcontrol) of a secondary output circuit, the at least one controlled variable specifying an output voltage or power of the switched-mode power supply; determining a mean oscillator clock in dependence on the at least one controlled variable (Vcontrol) determined such that the mean oscillator clock rises monotonously with the output power; specifying a random deviation from the mean oscillator clock; switching on a switching element to charge a storage element in dependence on the mean oscillator clock and the random deviation; and switching off the switching element in dependence on the at least one controlled variable (Vcontrol) determined.

LIST OF REFERENCE DESIGNATIONS

100 Switched-mode power supply unit
110 Primary input circuit
120 Switching element
130 Storage element
140 Secondary output circuit
150 Control circuit
160 Controllable oscillator circuit
170 Pulse-width controller
180 Comparator
190 Noise generator
200 Switched-mode power supply unit
210 Primary input circuit
220 Switching element
230 Storage element
240 Secondary output circuit
250 Control circuit
260 Oscillator circuit
270 Pulse-width controller
280 Comparator
300 Method
310 to 350 Method steps
Vcomp Control voltage
Vcontrol Controlled variable Vout+ Output voltage
Vprim Direct voltage
Vshunt Node voltage
Vf Control signal
Vn1 First random signal
Vn2 Second random signal

DETAILED DESCRIPTION

I provide a switched-mode power supply unit for a computer or a similar device. The switched-mode power supply unit comprises at least one switching element that switches a charging current for charging a storage element, at least one secondary output circuit that provides an output circuit, at least one controllable oscillator circuit that provides a switching clock and at least one control circuit that determines a switch-off time for the at least one switching element. In this context, in operation of the switched-mode power supply unit, a mean oscillator clock of the oscillator circuit is controlled in dependence on a controlled variable of the secondary output circuit and a switch-on time for the at least one switching element is determined in dependence on the mean oscillator clock and a random deviation.

By using a controllable oscillator circuit, the switching clock of a switching element that switches a charging current can be controlled and, in particular, lowered in dependence on a controlled variable which specifies, for example, an output voltage or power of the switched-mode power supply unit. Due to the additional use of a random deviation of a particular mean oscillator clock, unpleasant side effects such as, in particular, the occurrence of audible whistling noises can then be avoided.

The mean oscillator clock may be controlled in dependence on an output power of the secondary output circuit, the mean oscillator clock rising monotonously with the output power. Since the switching clock rises together with the output power of the switched-mode power supply unit, the switching losses can be reduced with maximum loading, especially in the case of a low output power, while keeping the same performance so that the energy efficiency of the switched-mode power supply unit is largely independent of the secondary output power.

The bandwidth of the random deviations referred to the mean oscillator clock may comprise at least one octave. As a result, an effective maximum switching clock of the at least one switching element is at least twice that of an effective minimum switching clock for a given mean oscillator clock of the oscillator circuit. By using a random deviation extending over at least one octave, the acoustic disturbances caused by the switched-mode power supply unit can be distributed over a wide frequency range so that they are scarcely perceptible for a human user.

The switch-off time is controlled additionally in dependence on the random deviation. In this context, the control is such that with an increase in the switching clock to a value above the mean oscillator clock, a duty ratio of the at least one switching element is reduced and with a dropping of the switching clock to a value below the mean oscillator clock, the duty ratio of the at least one switching element is enlarged. With an inverse adaptation of the random deviation of the switching clock and an instantaneous duty ratio, the energy transmission within each switching clock cycle can be kept largely constant even with a changed switching clock.

I also provide a method of operation to control a switched-mode power supply unit comprising:
  determining at least one controlled variable of a secondary output circuit,
  determining a mean oscillator clock in dependence on the at least one controlled variable determined,
  specifying a random deviation from the mean oscillator clock,
  switching on a switching element to charge a storage element in dependence on the mean oscillator clock and the random deviation, and
  switching off the switching element in dependence on the at least one controlled variable determined.

By the abovementioned steps, the switch-on time and the switch-off time of a switching element can be determined in dependence on a controlled variable of a secondary output circuit and on a random deviation. As a result, the at least one switching element can be driven according to demand within a wide range of output power of a switched-mode power supply unit.

The method may comprise the additional step of the inverse adaptation of a switch-on period of the switching element referred to a switching clock cycle of the switching element.

The abovementioned switched-mode power supply unit and, respectively, the method of operation to control a switched-mode power supply unit are especially suitable for use in a computer system. In particular, the switching clock of a switched-mode computer power supply unit in a standby mode or with a very low loading of a processor can be lowered below a frequency of 20 kHz, that is to say into the audible range. In contrast, the same power supply unit can be operated with a switching clock of more than 20 kHz in the case of extensive loading of the computer.

In the text which follows, my power supply units and methods will be explained in greater detail with reference to different illustrative examples with reference to the figures.

Figure 2:
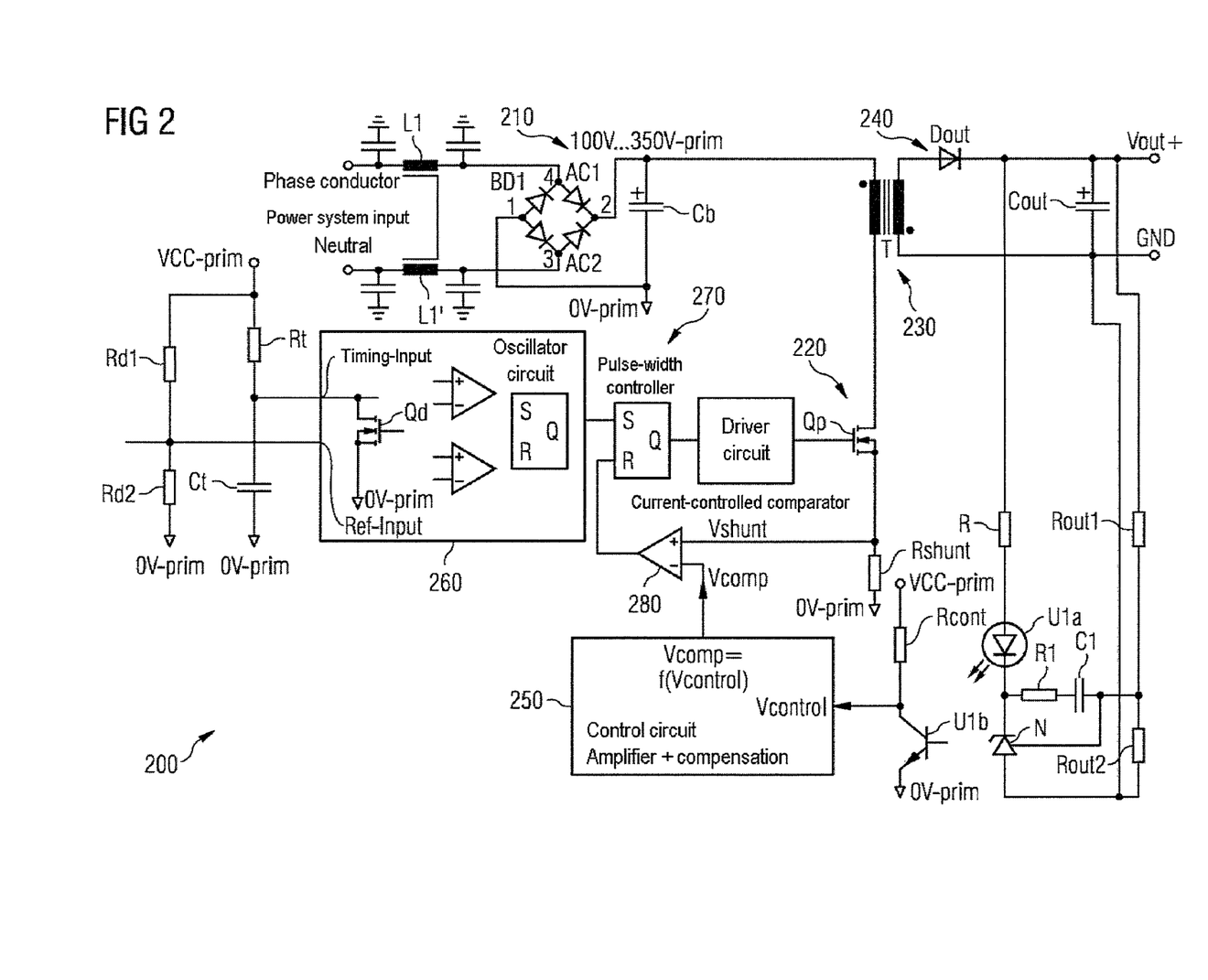
FIG. 2 shows a diagrammatic representation of a conventional switched-mode power supply unit.

To provide a better understanding, the conventional power supply unit according to FIG. 2 is initially described. The circuit shown in FIG. 2 shows a switched-mode power supply unit 200. The switched-mode power supply unit 200 in the illustrative example shown is a blocking transformer with switched-mode controller pulses obtained by a fixed frequency.

The switched-mode power supply unit 200 comprises a primary input circuit 210, a switching element 220 and a storage element 230. The switched-mode power supply unit 200 also comprises a secondary output circuit 240, a control circuit 250, an oscillator circuit 260, a pulse-width controller 270 and a comparator 280.

In the illustrative example shown, a bridge rectifier BD1 of the primary input circuit 210 provides for rectification and a storage capacitor Cb provides for smoothing of a primary alternating power system voltage provided at a power system input. Via a transistor Qb acting as switching element 220, the direct voltage Vprim provided by the primary input circuit 210 is chopped to magnetize the storage element 230. In the example according to FIG. 2, the storage element used is a coil core of a transformer T. The secondary output circuit 240 again rectifies the voltage pulses induced in a secondary coil of the transformer T via a diode Dout, smoothes it via the capacitor Cout and provides it as controlled output voltage Vout+ with respect to a ground potential via a secondary output.

To control the secondary output voltage Vout+, the secondary output circuit 240 comprises, among other things, a voltage controller N comprising a voltage divider for the output voltage Vout+ with resistors Rout1 and Rout 2, and a circuit comprising components R, R1 and C1 to provide a control voltage. For example, this is a PI controller. A controlled variable Vcontrol is provided for the control circuit 250 in dependence on the output voltage Vout+ via an optocoupler U1 comprising a light-emitting diode U1a and a phototransistor U1b. The control circuit 250 determines a control voltage Vcomp in dependence on the controlled variable Vcontrol. The control voltage Vcomp is compared to a node voltage Vshunt dependent on the current flow through the switching element 220, with respect to the ground potential, via the comparator 280 and used to drive the pulse-width controller 270.

In the illustrative example shown, the pulse-width controller 270 comprises a drive circuit having a set input S and a reset input R, and a driver circuit for driving the transistor Qp. When a clock pulse is present at the set input S which is provided with a fixed frequency from the oscillator circuit 260, the pulse-width controller 270 opens the switching element 220. The switching element 220 remains switched on until a current flow through the switching element 220, and thus the node voltage Vshunt across a shunt resistor Rshunt rises above the controlled value predetermined by the control voltage Vcomp from the control circuit 250. When the control voltage Vcomp is exceeded, the switching element 220 is interrupted by applying a reset signal at the reset input R of the drive circuit.

In principle, it is possible to increase the efficiency of the circuit described with reference to FIG. 2 by lowering the oscillator clock of the oscillator circuit 260 at a very low output power of the switched-mode power supply unit 200. For acoustic reasons, however, lowering is only meaningful up to a limit of about 20 to 25 kHz which approximately corresponds to the upper hearing threshold of a person. Further lowering of the oscillator clock of the oscillator circuit 260 leads to the occurrence of acoustic disturbances at the frequency of the switching clock. Such disturbances are perceptible to a person especially below 20 kHz and will disturb him.

Figure 1:
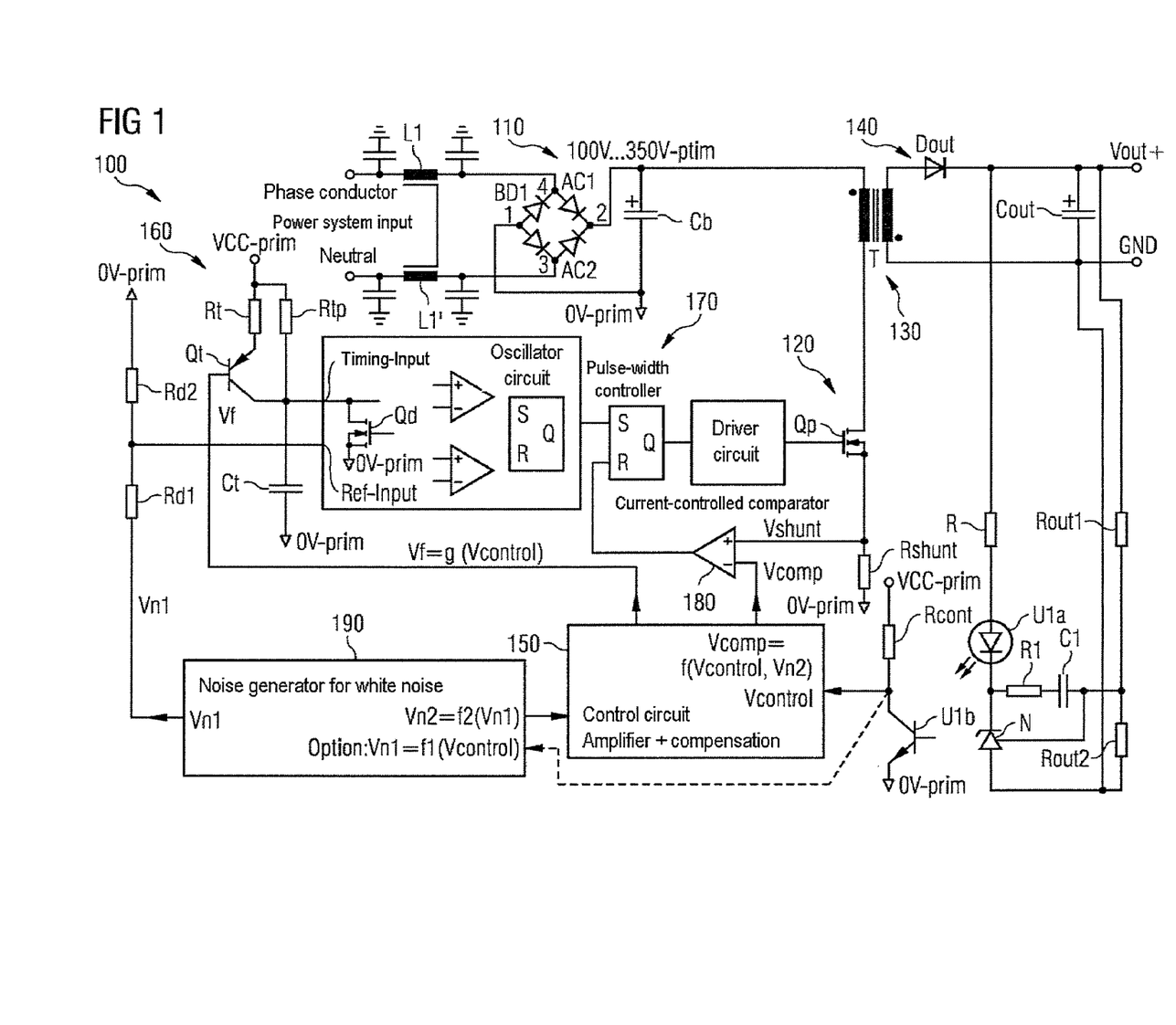
FIG. 1 shows a diagrammatic representation of an example of a switched-mode power supply unit.

FIG. 1 shows a diagrammatic representation of an example of one of my switched-mode power supply units 100. The switched-mode power supply unit 100 shown is again a switched-mode power supply unit according to the principle of a blocking transformer. The variations from the known switched-mode power supply unit 200, described in the text which follows, and the method of operating the switched-mode power supply unit 100, also described in the text which follows, can also be used with other types of switched-mode power supply units, however. In particular, the solution described is also suitable for use in in-phase forward converters and antiphase forward converters.

In the illustrative example shown, the switched-mode power supply unit 100 comprises a primary input circuit 110, a switching element 120 and a storage element 130. The switched-mode power supply unit 100 also comprises a secondary output circuit 140, a control circuit 150 and an oscillator circuit 160. The switched-mode power supply unit 100 furthermore comprises a pulse-width controller 170, a comparator 180 and a noise generator 190.

The primary input circuit 110, the switching element 120, the storage element 130, the secondary output voltage 140, the pulse-width controller 170 and the comparator 180 correspond in their structure to the similar components of the switched-mode power supply unit 200 described before. Compared to the switched-mode power supply unit 200 described before, the switched-mode power supply unit 100 therefore differs especially in that the control circuit 150 additionally provides a control signal Vf to drive the oscillator circuit 160. Furthermore, a first random signal Vn1 from the noise generator 190 is provided for the oscillator circuit 160. The oscillator circuit 160 is a controllable or tunable oscillator, the switching time of which can be adjusted in dependence on the input signals Vn1 and Vf.

The secondary output circuit 140 optionally connects to the noise generator 190 via a further line to determine the amplitude of the first random signal Vn1, generated by the noise generator 190, in dependence on the controlled variable Vcontrol of the secondary output circuit 140. The noise generator 190 may connect to the control circuit 150 via a further line to determine the control voltage Vcomp for switching off the switching element 120 in dependence on a second random signal Vn2 of the noise generator 190.

Compared to the conventional switched-mode power supply unit 200 described with reference to FIG. 2, the operation of the switched-mode power supply unit 100 according to FIG. 1 is changed as follows. In the example described, the controlled variable Vcontrol is used not only for the determination of the control voltage Vcomp by the control circuit 150 but also to determine the control signal Vf that controls the oscillator clock of the oscillator circuit 160. In the case of a falling output current of the switched-mode power supply unit 100, the controlled variable Vcontrol will drop because of the power supply unit output voltage Vout+, increasing as a result, via the controller N and the optocoupler U1. The control signal Vf which is provided via the control circuit 150 must suitably rise in this case, for example, linearly. In this manner, a charging current of a capacitor Ct of the oscillator circuit 160 is reduced. As a consequence, the oscillator clock of the oscillator circuit 160, and thus the switching clock of the switching element 120 of the switched-mode power supply unit 100 become reduced.

A resistor Rtp of the oscillator circuit 160 here symbolically represents a parallel resistor via which a minimum oscillator clock of the oscillator circuit 160 can be ensured optionally. The frequency adjustment range of the oscillator circuit 160 can correspond, for example, to the ratio of 1:25, thus, for example, to a frequency range from 2 kHz to 50 kHz. In the example of the blocking transformer described, the transmitted power can also be decreased by a factor of 25 by this frequency variation, with the switch-off current of the transistor Qp used as switching element 120 being kept constant, with switching losses lowered approximately by a factor of 25 at the same time.

So that the resultant, relatively low switching clock of the switching element 120 does not become audible as interfering acoustic whistling, the switching threshold of the oscillator circuit 160 is varied at the same time via a control input Ref-Input with the first random signal Vn1, for example, white noise, in the illustrative example shown. In the illustrative example described, the voltage of the first random signal Vn1 of the noise generator 190 is brought to a new random value after each oscillator clock cycle. In this context, the maximum amplitude of the first random signal Vn1 is adjusted such that the output switching clock of the oscillator circuit 160 varies additionally by a total of one to two octaves symmetrically around its mean oscillator clock which is determined via the control signal Vf. In other words, the duration of the period of the oscillator circuit 160 varies from 100 percent at the highest switching clock of the oscillator circuit 160 up to 200 or 400 percent, respectively, at the lowest switching clock of the oscillator circuit 160. This variation of the switching clock of the oscillator circuit 160 by the noise generator 190 is effected independently of the control signal Vf, but at the mean oscillator clock of the oscillator circuit 160.

A bandwidth of one to two octaves is advantageous to convert the acoustic whistling into a subjectively more pleasant noise with distinctly lower level. Preferably, the relative bandwidth of one to two octaves of the operating clock is kept largely constant at least within the audible frequency range to avoid problems in controlling the power supply unit 100.

In the illustrative example shown, the switch-off threshold of the transistor Qp is determined in accordance with the control voltage Vcomp on the basis of the controlled variable Vcontrol. In this context, however, the switch-off threshold is not reduced as much as in the case of the conventional circuit according to FIG. 2 because of the lowering of the switching clock at low output current of the output circuit 140.

So that the transmitted power of the power supply unit 100 does not fluctuate too much in the mean due to the signal of the noise generator 190 modulated on, the switch-off current value is varied in accordance with the control voltage Vcomp in a preferred example additionally by the second random signal Vn2 on the basis of the first random signal Vn1 of the noise generator 190. The variation is preferably effected such that the energy per switching pulse of the switching element 120, transmitted in the mean, is essentially independent of the first random signal Vn1 in spite of a variation of the switching clock due to the noise.

In the consideration following, operation of the blocking transformer shown in FIG. 1 is used as a basis again, by way of example, in which the transformer T is operated in a gapped triangular mode. That is to say the transformer T is completely demagnetized after each switching pulse (discontinuous mode). In this case, the following relationship results:

In the case of a constant transformer switch-off current, corresponding to a selected control voltage Vcomp, the transmitted power per switching pulse is proportional to the switching clock f. The energy content of a pulse having a variable switch-off current is $E=0.5 \times L \times I^2$, where L is the input inductance of the transformer T and I is the switch-off current. This results in $P=f \times 0.5 \times L \times I^2$ for the transmitted power, with f as switching clock. To produce no variation of the power P transmitted instantaneously in the example of the blocking transformer and with variation of the switching clock f by a first random signal Vn1 in spite of the noise, the current I must be changed synchronized in opposite directions such that the instantaneous power remains the same.

In the illustrative example described, that is the case with the current I is realigned in accordance with the reciprocal value of the root of the switching clock f. In simpler terms: if, for example, the switching clock of the oscillator circuit 160 is halved, that is to say the duration of the period of the switching clock f jumps up by a factor of 2 for a short time due to the first random signal Vn1, the switch-off current must be increased for a short time in this switching cycle via the control voltage Vcomp by a factor of the root of two from a mean control voltage Vmean in the absence of the first random signal Vn1, i.e., $Vcomp=Vmean \times 1.41$. In this case, the amount of the second random signal Vn2 thus mathematically corresponds to the square root of the amount of the first random signal Vn1, i.e., $Vn2=\sqrt{Vn1}$. To illustrate, this corresponds to an enlarged duty ratio of the switching element 120 with a reduced switching clock of the oscillator circuit 160 and vice versa.

The mean value Vmean of the control voltage Vcomp itself is determined, as described above, by the controlled variable Vcontrol. Among other things, this means that in this operating mode, the control voltage Vcomp by itself must not adjust the full switch-off current of the transistor Qp which corresponds to the full modulation of the transformer T. Otherwise, no modulation margin would remain for the noise of the noise generator 190. However, this is not a problem especially in the case of the low output power of the switched-mode power supply unit 100 of interest here.

Figure 3:
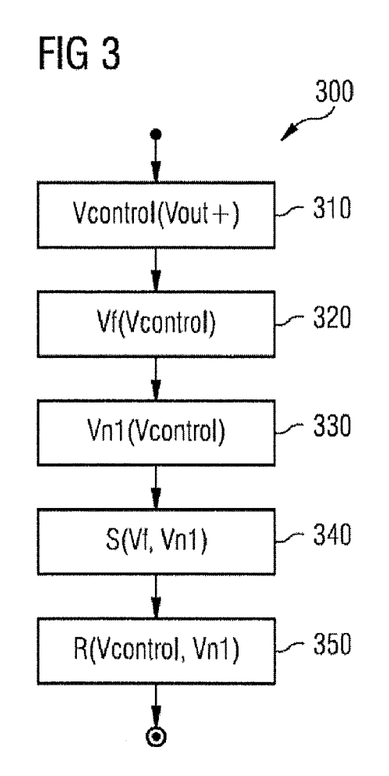
FIG. 3 shows a flow chart of a method of operation to control a switched-mode power supply unit.

FIG. 3 shows the steps of a method 300 for the operation of the switched-mode power supply unit 100 again diagrammatically.

In a first step 310, a controlled variable Vcontrol of the secondary output circuit 140 is determined. In particular, a control voltage is determined in the illustrative example shown which is essentially proportional to a difference of a nominal output voltage minus an instantaneous output voltage Vout+ of the secondary output circuit 140 over a short time.

In a step 320, a mean oscillator clock is determined in dependence on the controlled variable Vcontrol determined in step 310. In particular, a mean switching clock is set by providing the control signal Vf for the controllable oscillator circuit 160 by the control circuit 150 in the illustrative example. The control signal Vf begins with a minimum voltage predetermined by the resistor Rtp and then increases largely linearly with the controlled variable Vcontrol. Naturally, other functions are also possible, especially an incremental increase of the control signal Vf in dependence on the controlled variable Vcontrol in the case of digital control.

In a further step 330, a random deviation from the mean oscillator clock is determined. A first random signal Vn1 is provided for this purpose to adjust a switching threshold of the oscillator circuit 160 by the noise generator 190. Preferably, the bandwidth of the noise signal is selected such that it approximately corresponds to the range of from one to two octaves referred to the mean oscillator clock. In the area above 20 kHz, the first random signal Vn1 provided can be optionally reduced in amplitude by the controlled variable Vcontrol of the output circuit 140 since the controlled variable Vcontrol is a measure of the output load at the voltage output Vout+ and thus also of the mean oscillator clock.

In a further step 340, a switch-on time of a switching element 120 is determined to charge the storage element 130 of the switched-mode power supply unit 100. The switch-on time for the switching element 120 is then determined in dependence on both the mean oscillator clock of the oscillator circuit 160 and in dependence on the random deviation which is predetermined by the noise generator 190. The oscillator circuit 160 operating with the mean oscillator clock will provide a switching pulse at the set input S of the pulse-width controller 270, which switches on the transistor Qp, when the switching threshold predetermined by the noise generator 190 is exceeded.

In a further step 350, the switching element 120 is switched off in dependence on the controlled variable Vcontrol. For this purpose, a control voltage Vcomp is provided to the comparator 180 via the control circuit 150 in the illustrative example described, which comparator compares this voltage with a current node voltage Vshunt between the switching transistor Qp and the resistor Rshunt. It is thus possible to determine via the comparator 180 when the current flow through the primary coil of the transformer T, and thus through the transistor Qp, exceeds a reference value predetermined by the control circuit 150. If this reference value is exceeded, the comparator 180 provides a suitable control signal at the reset input R of the pulse-width controller 170 to open the switching element 120.

The method 30 described above ensures that a switched-mode power supply unit 100 is operated with a switching clock in a low-frequency range, particularly in the audible range, at low output power and, as a result, has very low switching losses. At the same time, the operation of the switched-mode power supply unit causes only slight noise at low level and is therefore not at all or scarcely audible even at a relatively low switching clock.

In the case of switching clocks above the audible range of about 20 kHz, modulation of the switching clock of the oscillator circuit 160 by one to two octaves is naturally not required and restricts the transferable power due to the modulation of the switch-off current needed additionally. This is apparent from the consideration represented above, because, at a, for example, minimum instantaneous switching clock of the oscillator circuit 160, the switch-off current of the transistor Qp, and thus the current of the transformer T should be adjusted to a higher current value than with a higher switching clock for compensation. However, the maximum power of the power supply unit 100 would be reached at a maximum switching clock and simultaneous maximum current of the transformer T. At 50 percent of the full modulation and the highest switching clock of the oscillator circuit 160, in contrast, only a quarter of the maximum power is reached.

Preferably, the modulation bandwidth of the oscillator circuit 160 can, therefore, be restricted from two octaves to a distinctly lower value or switched off completely above, for example, 25 kHz. The noise bandwidth should be restricted monotonously and preferably linearly with the mean oscillator clock to not introduce any unsteadiness in the control.

This can be realized, for example, by the fact that the full modulation of the control voltage Vcomp is effected in accordance with the switch-off current by the controlled variable Vcontrol at high load up to the full final current of the transformer T and an additional detection circuit, not shown in FIG. 1, is introduced which prevents the transistor Qp from being switched on again via the oscillator circuit 160 until the transformer T is demagnetized again completely thereafter. This indirectly introduces a limitation of the maximum switching clock f so that the modulation by the noise of the noise generator 190 becomes smaller and smaller at high load of the power supply unit 100. At a very low load, in contrast, the clock f is so low that the renewed switch-on of transistor Qp is determined exclusively by the oscillator circuit 160 with a bandwidth, caused by the noise of the noise generator 190, of, for example, two octaves.

A further alternative or additional example lowers the amplitude of the noise generator 190 when the switching clock f is above the audible range. The full bandwidth of, for example, two octaves is still advantageous, for example, with a switching clock of 5 to 20 kHz whilst a variation of, for example, 10 kHz to 40 kHz is no longer necessary since signal components above 20 kHz are no longer perceived. Accordingly, one octave will already be sufficient here for masking the interference signal generated by lowering the operating clock of the oscillator circuit 160.

The bandwidth can be reduced by the link, drawn dashed in FIG. 1, between the controlled variable Vcontrol and the noise generator 190. At a high load at the output Vout+ of the secondary output circuit 140, the output voltage Vout+ has a tendency of dropping. The controller N thereupon reduces the current of the light-emitting diode U1a and the controlled variable Vcontrol in the form of the voltage at the node between the phototransistor U1b and the resistor Rcont becomes relatively large. In this case, the oscillator circuit 160 must have a relatively high switching clock f. Under this condition, the maximum amplitude of the first random signal Vn1 of the noise generator 190 will then be reduced from, for example, two octaves with minimum output power, that is to say, for example, of a ratio of 1:4 or plus 300 percent, to, for example, now only plus ten percent or even zero percent at maximum output power. In this context, further lowering of the amplitude of the random signal also contributes to an improved radio interference suppression.

The switched-mode power supply unit 100 and the control method 300 have been described previously with reference to a discrete analog circuit. Naturally, all control measures described before can also be implemented with the aid of suitable digital control components, particularly in the form of control code of a microcontroller. Thus, in particular, microcontrollers can be programmed to control switched-mode power supply units such that they perform the method 300 and thus achieve an improved efficiency in the range of a low output power.

Furthermore, the control measures and circuit modifications described are not restricted to the blocking transformer described before but can also be applied to other switched-mode power supply unit types such as, especially, feed forward converters, step-down converters and step-up converters. Naturally, circuits are also possible which have more than one switching and/or storage element or even several secondary output circuits. For example, the circuit described above can be modified such that with a push-pull transformer, the switching frequency of two or more switching elements is varied in accordance with the inputs of a random signal. Similarly, other storage elements such as, in particular, storage capacitors or coils can be used.

The invention claimed is:

1. A switched-mode power supply unit for a computer comprising:
   at least one switching element that switches a charging current to charge a storage element;
   at least one secondary output circuit that provides an output voltage (Vout+);
   at least one controllable oscillator circuit that provides a switching clock;
   at least one control circuit that determines a switch-off time for the at least one switching element; and
   a noise generator that generates at least one random signal (Vn1, Vn2) to determine the random deviation;
   wherein, in operation of the switched-mode power supply unit, a mean oscillator clock frequency of the oscillator circuit is controlled in dependence on a controlled variable (Vcontrol) specifying the output voltage or power of the secondary output circuit such that the mean oscillator clock frequency rises monotonously with the output voltage or power and a switch-on time for the at least one switching element is determined in dependence on the mean oscillator clock frequency and the random deviation, and
   wherein the switch-off time is controlled additionally in dependence on random deviation such that with an increase in the switching clock frequency to a value above the mean oscillator clock frequency, a duty ratio of the at least one switching element is reduced and with a dropping of the switching clock frequency to a value below the mean oscillator clock frequency, the duty ratio of the at least one switching element is enlarged.

2. The switched-mode power supply unit according to claim 1, wherein a bandwidth of the random deviation referred to the mean oscillator clock frequency comprises at least one octave.

3. The switched-mode power supply unit according to claim 1, wherein the at least one random signal (Vn1, Vn2) is regenerated for each switching clock cycle of the oscillator circuit by the noise generator.

4. The switched-mode power supply unit according to claim 1, wherein the noise generator is configured to determine a maximum amplitude of the at least one random signal (Vn1, Vn2) in dependence on the controlled variable (Vcontrol).

5. The switched-mode power supply unit according to claim 1, wherein the output voltage is provided to a computer, and wherein the mean oscillator clock frequency in a fully loaded state of the computer is above an upper hearing threshold of a human user and below the upper hearing threshold of the human user in a standby state of the computer.

6. A switched-mode power supply unit for a computer comprising:
   at least one switching element that switches a charging current to charge a storage element;
   at least one secondary output circuit that provides an output voltage (Vout+);
   at least one controllable oscillator circuit that provides a switching clock;
   a noise generator that generates at least one random signal (Vn1, Vn2); and
   at least one control circuit that determines a switch-off time for the at least one switching element;
   wherein, in operation of the switched-mode power supply unit, a mean oscillator clock frequency of the oscillator circuit is controlled in dependence on a controlled variable (Vcontrol) of the secondary output circuit; a maximum amplitude of the at least one random signal (Vn1, Vn2) of the noise generator is determined in dependence on the controlled variable (Vcontrol); and a switch-on time for the at least one switching element is determined in dependence on the mean oscillator clock frequency and a random deviation determined by the random signal of the noise generator, and
   wherein the switch-off time is controlled additionally in dependence on the random deviation in such a manner that with an increase in the switching clock frequency to a value above the mean oscillator clock frequency, a duty ratio of the at least one switching element is reduced and with a dropping of the switching clock frequency to a value below the mean oscillator clock frequency, the duty ratio of the at least one switching element is enlarged.

7. The switched-mode power supply unit according to claim 6, wherein the mean oscillator clock frequency is controlled in dependence on an output power of the secondary output circuit, the mean oscillator frequency clock rising monotonously with the output power.

8. The switched-mode power supply unit according to claim 6, wherein a bandwidth of the random deviation referred to the mean oscillator clock frequency comprises at least one octave.

9. The switched-mode power supply unit according to claim 6, wherein the at least one random signal (Vn1, Vn2) is regenerated for each switching clock cycle of the oscillator circuit by the noise generator.

10. The switched-mode power supply unit according to claim 6, wherein the output voltage is provided to a computer, and wherein the mean oscillator clock frequency in a fully loaded state of the computer is above an upper hearing threshold of a human user and below the upper hearing threshold of the human user in a standby state of the computer.

11. A method of operation for a switched-mode power supply unit comprising:
   determining at least one controlled variable (Vcontrol) of a secondary output circuit, the at least one controlled variable specifying an output voltage or power of the switched-mode power supply;
   determining a mean oscillator clock frequency in dependence on the at least one controlled variable (Vcontrol) determined such that the mean oscillator clock frequency rises monotonously with the output power;
   generating at least one random signal ($Vn_1$, $Vn_2$) with a noise generator;
   specifying a random deviation from the random signal ($Vn_1$, $Vn_2$) and the mean oscillator clock frequency;
   switching on a switching element to charge a storage element in dependence on the mean oscillator clock frequency and the random deviation; and
   switching off the switching element in dependence on the at least one controlled variable (Vcontrol) determined,
   wherein the switch-off time is controlled additionally in dependence on the random deviation in such a manner that with an increase in the switching clock frequency to a value above the mean oscillator clock frequency, a duty ratio of the at least one switching element is reduced and with a dropping of the switching clock frequency to a value below the mean oscillator clock frequency, the duty ratio of the at least one switching element is enlarged.

12. The method according to claim 11, further comprising:
   inverse adaptation of a switch-on duration of the switching element referred to a switching clock of the switching element.

13. The method according to claim 12, wherein the step of switching off the switching element comprises:
   determining a maximum charging current for the at least one storage element in dependence on an instantaneous output power of the secondary output circuit;
   determining an instantaneous charging current of the at least one storage element;
   comparing the instantaneous charging current with the maximum charging current; and
   switching off the switching element when the instantaneous charging current exceeds the maximum charging current.

14. The method according to claim 11, wherein, in the step of switching-off, the specified random deviation is additionally taken into consideration in such a manner that for a given output power of the switched-mode power supply unit, essentially the same energy is transferred to the storage element in each switching cycle of the switching element.

15. The method according to claim 14, wherein the step of switching off the switching element comprises:
   determining a maximum charging current for the at least one storage element in dependence on an instantaneous output power of the secondary output circuit;
   determining an instantaneous charging current of the at least one storage element;
   comparing the instantaneous charging current with the maximum charging current; and
   switching off the switching element when the instantaneous charging current exceeds the maximum charging current.

16. The method according to claim 11, wherein the step of switching off the switching element comprises:
   determining a maximum charging current for the at least one storage element in dependence on an instantaneous output power of the secondary output circuit;
   determining an instantaneous charging current of the at least one storage element;
   comparing the instantaneous charging current with the maximum charging current; and switching off the switching element when the instantaneous charging current exceeds the maximum charging current.

\* \* \* \* \*